(12) United States Patent
Odenbreit

(10) Patent No.: US 9,501,440 B2
(45) Date of Patent: Nov. 22, 2016

(54) SLAVE CONTROL DEVICE AND METHOD FOR PROGRAMMING A SLAVE CONTROL DEVICE

(71) Applicant: VOLKSWAGEN AG, Wolfsburg (DE)

(72) Inventor: Florian Antonio Odenbreit, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 328 days.

(21) Appl. No.: 14/353,633

(22) PCT Filed: Oct. 9, 2012

(86) PCT No.: PCT/EP2012/004228
§ 371 (c)(1),
(2) Date: Apr. 23, 2014

(87) PCT Pub. No.: WO2013/060419
PCT Pub. Date: May 2, 2013

(65) Prior Publication Data
US 2014/0297913 A1    Oct. 2, 2014

(30) Foreign Application Priority Data
Oct. 27, 2011   (DE) .......................... 10 2011 117 083

(51) Int. Cl.
| G06F 13/00 | (2006.01) |
| G06F 13/364 | (2006.01) |
| H04L 12/40 | (2006.01) |
| H04L 12/403 | (2006.01) |
| G06F 9/48 | (2006.01) |
| H04L 29/08 | (2006.01) |

(52) U.S. Cl.
CPC .......... *G06F 13/364* (2013.01); *G06F 9/4881* (2013.01); *H04L 12/403* (2013.01); *H04L 12/40019* (2013.01); *H04L 12/40202* (2013.01); *H04L 67/12* (2013.01); *H04L 2012/40234* (2013.01)

(58) Field of Classification Search
CPC .............. H04L 2012/40234; H04L 12/40202; H04L 12/40019; H04L 12/403; G06F 13/364; G06F 9/4881
See application file for complete search history.

(56) References Cited

FOREIGN PATENT DOCUMENTS

| DE | 19847701 A1 | 4/2000 |
| DE | 202005012013 U1 | 12/2006 |
| DE | 102007054810 A1 | 5/2009 |
| DE | 102009045055 A1 | 3/2011 |
| DE | 102010030811 A1 | 1/2012 |
| WO | 9729563 A1 | 8/1997 |
| WO | 03039098 A2 | 5/2003 |

OTHER PUBLICATIONS

Search Report for German Patent Application No. 10 2011 117 083.2; Jun. 25, 2012.
Search Report for International Patent Application No. PCT/EP2012/004228; Dec. 11, 2012.

*Primary Examiner* — Ernest Unelus
(74) *Attorney, Agent, or Firm* — Barnes & Thornburg LLP

(57) ABSTRACT

A slave control device for use in a master/slave bus system having at least two programs that are stored in the slave control device, wherein the programs are matched to different masters that differ in schedule tables, at least one distinguishing feature of the schedule tables is stored in the slave control device, the respectively connected master is detected as a function of the distinguishing feature and the associated program is loaded into a program memory or remains loaded. Also disclosed is a method for programming a slave control device.

9 Claims, 1 Drawing Sheet

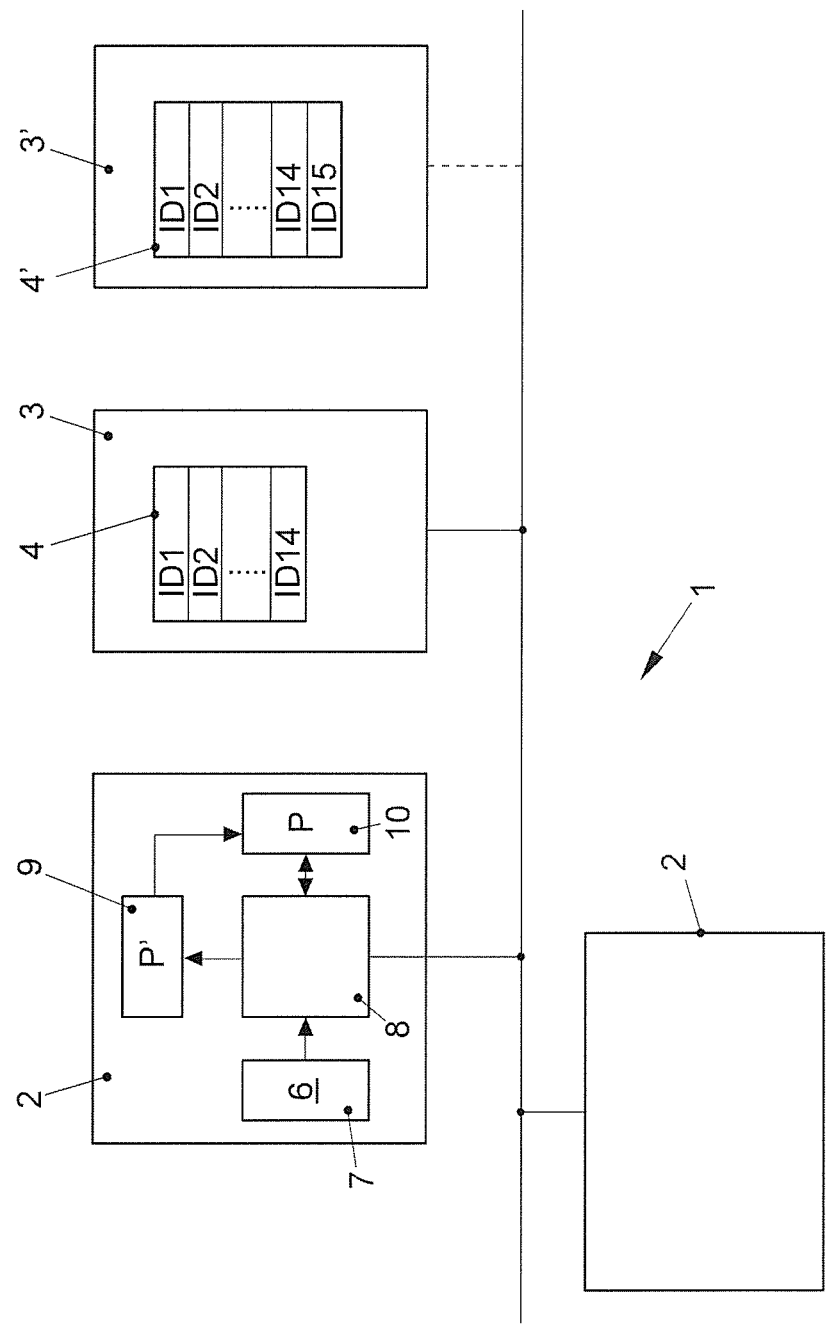

SLAVE CONTROL DEVICE AND METHOD FOR PROGRAMMING A SLAVE CONTROL DEVICE

PRIORITY CLAIM

This patent application is a U.S. National Phase of International Patent Application No. PCT/EP2012/004228, filed 9 Oct. 2012, which claims priority to German Patent Application No. 10 2011 117 083.2, filed 27 Oct. 2011, the disclosures of which are incorporated herein by reference in their entirety.

SUMMARY

Illustrative embodiments relate to a slave control device and to a method for programming a slave control device.

BRIEF DESCRIPTION OF THE DRAWINGS

Disclosed embodiments are explained in more detail below with reference to the single FIGURE, in which:

FIG. 1 shows a schematic block diagram of a LIN bus system.

DETAILED DESCRIPTION OF THE DISCLOSED EMBODIMENTS

Disclosed embodiments provide a slave control device and a method for programming a slave control device which can be used to adapt the slave control device to different masters using simple means.

The slave control device for use in a master/slave bus system is designed such that at least two programs are stored in the slave control device, the programs being matched to different masters which differ in terms of their schedule tables, at least one distinguishing feature of the schedule table being stored in the slave control device, the respectively connected master being detected on the basis of the distinguishing feature and the associated program being loaded into a program memory or remaining loaded. The slave control device is able to detect its system environment and to independently adapt to the detected system environment and the associated master. This also dispenses with coding steps to select a software variant using an identifier, for example. Depending on the refinement, although such coding is progress in comparison with the provision of all variants, it must be frequently maintained if modifications are made to the type designations. All of this is avoided according to the disclosed embodiments. The distinguishing feature may be, for example, a message which is used in the schedule table and occurs only in one master. However, the distinguishing feature may also be, for example, the sequence of the messages or the interval of time between the messages from the master. If there are a plurality of distinguishing features, more than one distinguishing feature may be evaluated, for example all distinguishing features. The distinguishing feature(s) may be individually stored in the slave control device or else the complete schedule tables are stored, in which case the master which is currently connected to the slave control device can be determined by comparison with the received schedule. The program memory may be an EEPROM.

In at least one disclosed embodiment, the slave control device is a LIN slave control device, that is to say the master and slave control device communicate using the LIN protocol.

In another disclosed embodiment, one of the programs is stored as a default program in the program memory. This default program may be the program of the master used most, with the result that reprogramming of the program memory is reduced on average.

In yet another disclosed embodiment, the loaded program or the program remaining in the program memory is stored persistently, that is to say in a non-volatile manner, after the associated master has been detected. This avoids the slave control device having to be trained again with each restart. However, this presupposes that the environment does not change, which can usually be assumed, however.

In a further disclosed embodiment, the slave control device waits for at least one run through a schedule table before the respective program is loaded or remains loaded. In this case, the time for a run is typically below a permissible start-up time of a slave control device, in particular a LIN slave control device, with the result that correct operation can be expected from the outset already in the first wake cycle of the slave control device. If correct operation does not play a large role in the first seconds of the first wake cycle of the slave control device, the detection period can be extended to a few seconds for reasons of robustness.

The LIN bus system 1 comprises a plurality of slave control devices 2, in which case one slave control device 2 is illustrated in somewhat more detail. Different masters 3, 3' can be alternatively connected to the LIN bus system 1, in which case the master 3 is connected in the illustrated example, which is why the connection is illustrated using dashed lines for the master 3'. A schedule table 4, 4' which corresponds to a schedule of the messages used is associated with each of the masters 3, 3'. In the example illustrated, the schedule tables 4 and 4' differ by virtue of the fact that a message ID15 also occurs in the schedule table 4'.

This distinguishing feature 6 is known in advance and is stored in a memory 7 in at least one slave control device 2. The slave control device 2 also has a processor 8, a further memory 9 and a program memory 10. Matched programs P, P' for the masters 3, 3' are stored in the slave control device 2, the program P being associated with the master 3 and the program P' being associated with the master 3'. In this case, the program P is stored as a default program in the program memory 10 which is an EEPROM, for example. In contrast, the program P' is stored in the memory 9.

If the LIN bus system 1 is now set up, the slave control device 2 first of all does not know which master 3 or 3' is installed. After starting up, the master 3 begins to process its schedule table and begins to send messages. The slave control device 2 now listens to the bus traffic. The processor 8 checks the bus traffic for the presence of the distinguishing feature 6. Depending on whether a message ID15 has been detected, the slave control device 2 detects whether a master 3 or a master 3' is connected. In the present case, the slave control device 2 does not detect an ID15 after a full schedule run, with the result that the presence of a master 3 is derived therefrom. The slave control device 2 then selects the associated program P, which is already a default program in the program memory 10. No further adaptation at all therefore needs to be made.

In contrast, if the slave control device 2 had detected a master 3', the slave control device would have loaded the program P' from the memory 9 into the program memory 10. The slave control device 2 therefore independently detects its environment and automatically adapts itself.

In this case, it should be noted that not all slave control devices 2 of the LIN bus system 1 must be designed according to the disclosed embodiments. The memory 7 containing the distinguishing feature(s) 6 may also be integrated in this case in the memory 9 or in the processor 8 or in the program memory 10.

In bus systems, a distinction is generally made between master/slave bus systems and multimaster bus systems. In this case, the assignment is fixed in a master/slave bus system, that is to say there is one master and one or more slaves. In contrast, in a multimaster bus system, each control device may be a master or a slave at a time, that is to say the assignment is not fixed.

In a motor vehicle, suitable bus systems are needed for the cost-effective communication of intelligent sensors and actuators, for example for networking inside a door or a seat. Such a cost-effective bus system is the LIN bus, for example. LIN stands for Local Interconnect Network. A LIN bus system is composed of a LIN master and one or more LIN slaves which constitute network nodes in the bus system. The LIN master has knowledge of the temporal sequence of all data to be transmitted and therefore undertakes control. The data are transmitted by a LIN slave when requested to do so by the LIN master. The request is made by transmitting a LIN message whose header contains a particular message address. Only one LIN message is ever transmitted at any time. As a result, there is no need for a mechanism for resolving bus collisions since it is not possible for collisions to occur in a LIN bus system. The temporal sequence of the LIN messages is recorded in a so-called schedule table, that is to say a timetable, which can be changed if required.

A LIN bus is therefore a master/slave bus system, whereas a CAN (Controlled Area Network) bus is a multimaster bus system.

DE 10 2007 054 810 A1 discloses a method for detecting different communication protocols in a control device having at least two communication drivers, in which case a check is carried out in the control device to determine whether received data match a communication protocol which is associated with a communication driver selected from the at least two communication drivers, to detect valid or defective communication in this manner. A control device can therefore be operated with a LIN protocol or a K-line protocol, as required. The automatic detection of the protocol results in a small variety of variants and therefore in financial savings since a product with a type part number can be used in different vehicle types. In this case, the method makes it possible to detect both different types of bus, for example K-line, LIN etc., and different baud rates or other typical bus parameters.

Even when the same communication protocol is used, applications are possible in which a slave control device is intended to be used together with different masters. The problem of reducing the variety of variants also arises here.

The invention claimed is:

1. A slave control device for use in a master/slave bus system comprising:
   at least two programs stored in one or more memories in the slave control device, the programs being matched to the different masters that differ in terms of respective schedule tables in the masters;
   wherein at least one distinguishing feature of the schedule tables includes data for at least one message;
   wherein the at least one distinguishing feature for each of the different masters is stored in the slave control device
   wherein the different masters are detected based on the distinguishing features and the associated program that is loaded into a program memory or remains loaded in the program memory; and
   wherein communication between the master and the slave is only initiated by the master, and the slave control device is configured to be connected together with different masters.

2. The slave control device of claim 1, wherein the slave control device is a Local Interconnect Network (LIN) slave control device.

3. The slave control device of claim 1, wherein one of the programs is stored as a default program in the program memory.

4. The slave control device of claim 1, wherein the loaded program is stored persistently.

5. A method for programming a slave control device for use in a master/slave bus system, the method comprising:
   storing at least two programs in one or more memories in the slave control device, the programs being matched to different masters which differ in terms of respective schedule tables in the masters;
   storing at least one distinguishing feature of the schedule tables in the slave control device, the programs being matched to the different masters that differ in terms of their schedule tables, wherein the at least one distinguishing feature includes data for at least one message used in the schedule tables;
   detecting the master for the slave control device based on the distinguishing feature; and
   loading or maintaining in a program memory the program associated with the detected master;
   wherein communication between the master and the slave is only initiated by the master, and the slave control device is configured to be connected together with different masters.

6. The method of claim 5, wherein the master and the slave control device communicate using a Local Interconnect Network (LIN) protocol.

7. The method of claim 5, wherein one of the programs is stored as a default program in the program memory.

8. The method of claim 5, wherein the loaded program is stored persistently.

9. The method of claim 5, wherein the slave control device waits for at least one run through a schedule table before the respective program is loaded.

* * * * *